Feb. 7, 1956     A. H. HABERSTUMP     2,733,886
REARVIEW MIRROR FOR A MOTOR VEHICLE
Filed Dec. 4, 1951
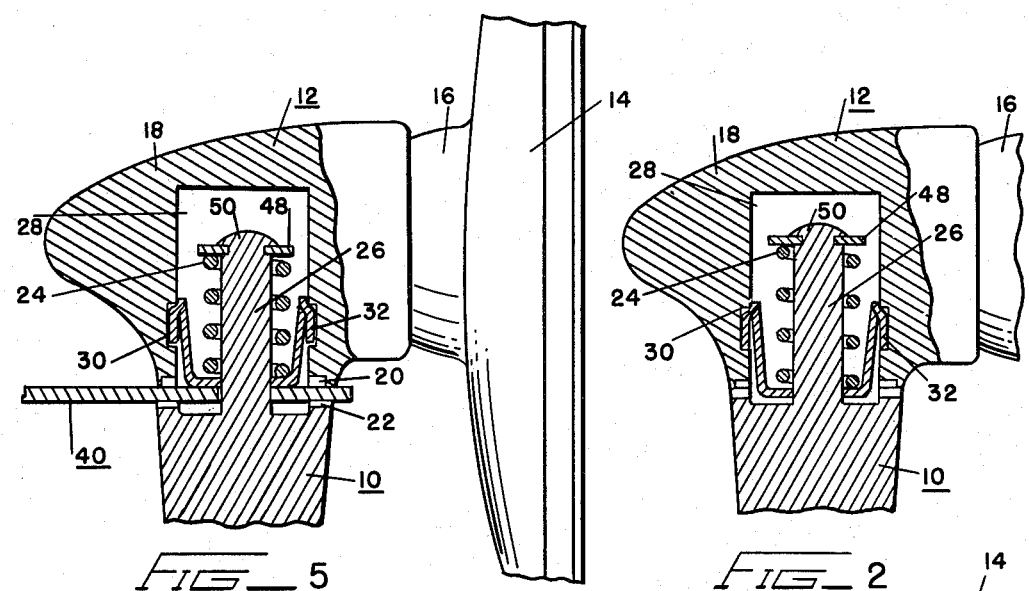
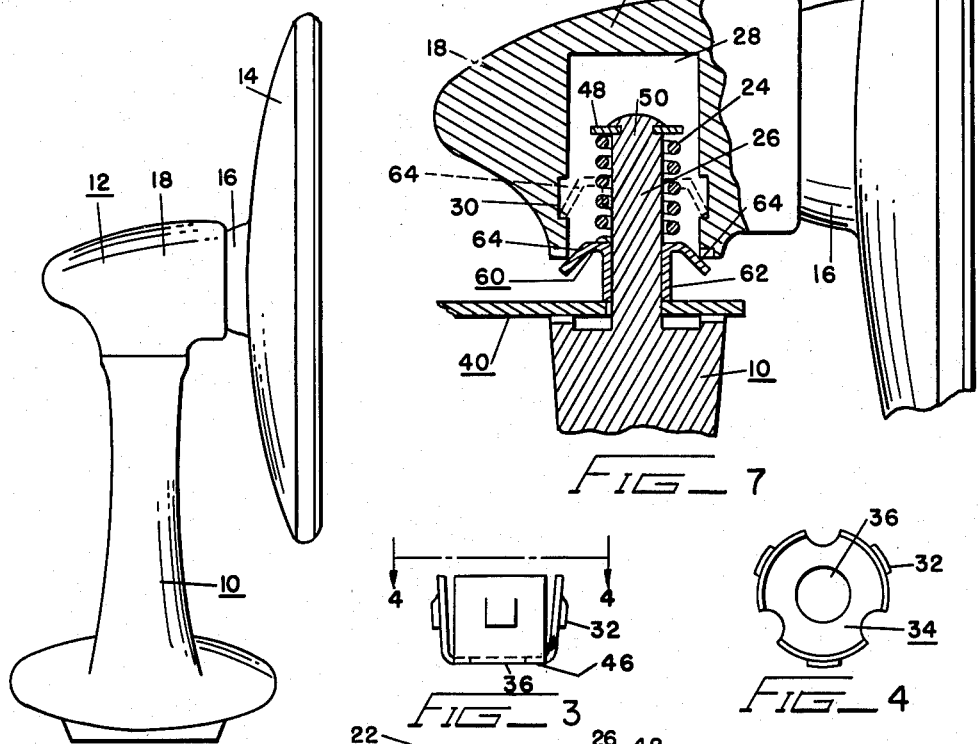
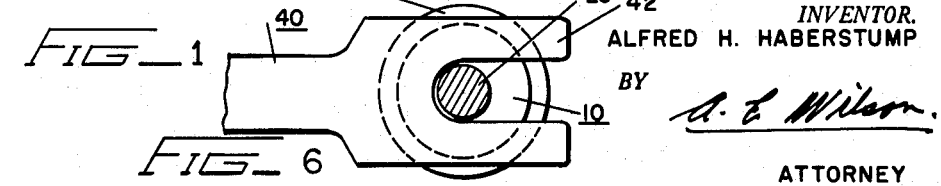
INVENTOR.
ALFRED H. HABERSTUMP
BY
ATTORNEY

United States Patent Office 2,733,886
Patented Feb. 7, 1956

2,733,886

REARVIEW MIRROR FOR A MOTOR VEHICLE

Alfred H. Haberstump, Detroit, Mich., assignor to George C. Knight Company, Detroit, Mich., a corporation of Michigan Application December 4, 1951, Serial No. 259,812

2 Claims. (Cl. 248—203)

This invention relates to rear view mirrors for motor vehicles, and more particularly to improved fastening means between angularly movable mirror carrying or head assemblies and supporting arm or base members.

Rear view mirrors have been extensively used to enable drivers of vehicles to observe road and traffic conditions behind the vehicle. To adopt rear view mirrors for use by drivers varying widely in physical stature, it has been found desirable that means be provided to permit readily varying the angular relation between a mirror carrying or head assembly and a supporting arm or base member. Such angular adjusting mechanism may be incorporated into a rear view mirror assembly in such a manner that the mirror carrying head assembly may be moved angularly about an axis extending substantially perpendicular to the longitudinal axis of the vehicle or the supporting base of the vehicle as disclosed in Patent 2,533,475. The mirror carrying head assembly may, if desired, be moved about an axis extending substantially parallel with the longitudinal axis of the vehicle or of the supporting base as described in the application of Carlton G. Koonter, Serial No. 101,571, filed June 27, 1949, now Patent No. 2,701,113. It will, of course, be apparent that the angular adjustment between the base or supporting arm and the mirror may be about an axis extending at any desired angle relative to the longitudinal axis of the vehicle or of the supporting base of the mirror assembly.

An object of this invention is to provide an improved connection of the so-called "blind" type between two members.

A further object of the invention is to provide an angularly adjustable joint between two members so proportioned that the connection can be made at the joint without gaining access to the joint from the reverse side of either of the members.

Still another object of the invention is to provide an improved rear view mirror having a resilient angularly movable joint between a supporting base or arm, and a mirror carrying member or head.

Another object of the invention resides in the provision of a holding clip resiliently secured to one of a pair of members to be secured together and adopted to project into and lock within a recess in the other of the members.

Yet another object of the invention is to provide an improved method of securing together angularly movable portions of a rear view mirror assembly in such a manner that access need not be had from either side of the connection.

Still another object of the invention is to provide an angularly movable blind type theft proof connection between a mirror carrying head assembly and a supporting arm or base.

Further objects and advantages of this invention will be apparent from the following description taken in connection with the appended drawings in which:

Fig. 1 is a side elevational view of a rear view mirror embodying my invention.

Fig. 2 is an enlarged fragmentary view, partly in section, illustrating my improved connection between angularly movable portions of a rear view mirror.

Fig. 3 is a side elevational view of a spring clip employed to hold the angularly movable members together.

Fig. 4 is a plan view of the spring clip illustrated in Fig. 3.

Fig. 5 is a view similar to Fig. 2 illustrating a step in the assembly of the angularly movable members.

Fig. 6 is a view illustrating a step in the assembly of any improved rear view mirror.

Fig. 7 is a sectional view illustrating a modified form of attaching clip.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now to the drawings, it will be noted that Fig. 1 illustrates a rear view mirror having a supporting base or arm 10 adapted to be secured in any desired manner to the side of a motor vehicle. A mirror carrying or head assembly 12 has a shell 14 adapted to support the mirror and has an outwardly flared section 16 adapted to be secured to a body portion 18 of the head assembly 12 in such a manner as to move angularly relative thereto.

The body portion 18 of the head assembly 12 is secured to the supporting base or arm 10 in such a manner as to be movable angularly relative thereto about an axis intersecting the connection of the section 16 of the shell 14 and the body portion 18 of the head assembly 12. The juncture between the body portion 18 and the arm or base 10 is formed with a plurality of cooperating serrations 20 and 22 respectively adapted to interengage to hold the head assembly 12 in any angularly related portion relative to the base or supporting arm 10 to which it is moved. Yielding means in the form of a spring 24 are provided to urge the head assembly and base toward each other to maintain the serrations 20 and 22 in interengagement with each other and maintain predetermined angular relation between the head assembly and the supporting arm.

The supporting arm or base 10 is provided with a projection 26 positioned circumferentially within and in the embodiment disclosed extending beyond the serrations 22. The body portion 18 of the head assembly 12 is in the embodiment illustrated formed with a circular recess 28 positioned within the serrations 20. An annular groove 30 is formed in the recess 28 of the body portion 18 adjacent the outer end of the recess to receive a plurality of outwardly flared tabs 32 formed on an attaching clip 34. The clip 34 is of generally cup shaped configuration and has a central aperture 36 adopted to receive the projection 26 carried by the supporting arm or base 10.

In securing the mirror carrying or head assembly 12 to the supporting base or arm 10, a tool 40 is employed. The tool 40 has a bifurcated end, the spaced prongs 42 and 44 of which are adapted to straddle the projection 26 of the base or arm 10. The clip 34 is then positioned with its aperture 36 receiving the projection 26 and its base 46 resting on the prongs 42 and 44 of the tool 40. The spring 24 is then positioned on the projection 26, its lower end resting within the cup shaped body of the clip 34. A washer 48 is placed on the upper end of the spring 24 and forced downwardly to compress the spring and force the reduced end portion of the projection 26 through the washer. The end of the projection is then deformed as illustrated at 50 to overlie the wider edges of the washer 48 to secure the spring 24 and clip 34 in place. If desired, other fastening means may be employed, for example the end of the projection 26 may be threaded and the washer 48 secured in place thereon by a screw.

The head assembly 12 is then placed on the base or arm 10, the recess 28 receiving the projection 26. As the body portion 18 is moved downwardly over the projection 26 the outwardly flared tabs 32 of the clip 34 snaps into the annular groove 30 formed near the bottom of the recess 28 in the body portion 18 of head assembly 12. The tool 40 may then be withdrawn whereupon the spring 24 exerts a yielding force through the clip 34 to hold the head assembly 12 on the base or arm 10, the serrations 20 and 22 being maintained in engagement with each other to hold the head assembly in any angularly adjusted position to which it is moved relative to the base or arm 10. The angular position of the head assembly 12 relative to the arm or base 10 can be changed as desired by merely grasping the head assembly and moving it to the desired angular position. The serrations 20 and 22 exert a camming force on each other whereupon the head assembly shifts axially relative to the base or arm 10, compressing the spring 24 to permit the ends of the serrations 20 and 22 to clear each other and permit angular movement of the head and base 12 and 10 respectively.

It will be apparent that I have devised a connection which permits angular adjustment of a mirror relative to its support and which may be assembled without the necessity of gaining access to the reverse side of either of the members. Also it will be apparent that if desired the connection may be reversed, for example, the projection 26 may be carried by the head assembly 12 and the recess 28 may be formed in the supporting base or arm 10.

The embodiment of the invention illustrated in Fig. 7 is similar to that heretofore described with the exception that a different type of attaching clip 60 is employed. The clip 60 has a tubular section 62 adapted to surround the projection 26 and a plurality of angularly related tabs 64 adapted to project into the annular groove 30 of the recess 28. It will be noted that in this embodiment of the invention the spring 24 exerts a downward force on the top of the clip 60. This force is transmitted through the tabs 64 of the clip 60 to the body section 18 of the head assembly 12 through the annular groove 30 in the recess 28.

While the invention has been described with particular reference to certain specific embodiments, it will be apparent that various changes can be made without departing from the spirit of my invention.

I claim:

1. In a rear view mirror, a supporting arm having radially extended serrations and a projection positioned circumferentially within and extending beyond the serrations, an attaching clip positioned on said projection and having a plurality of outwardly flared tabs, yielding means urging the attaching clip toward the serrations of the supporting arm, the combination therewith of a head assembly connected to the supporting arm and including a body portion having radially extended serrations adapted to engage the radially extended serrations of the supporting arm, the body portion having a cylindrical recess extending axially within the serrations and having a channel in the walls of the cylindrical recess adjacent the serrations for the reception of the outwardly flared tabs of the attaching clip to provide a theft proof attachment to retain the supporting arm and head assembly in angularly adjustable relation.

2. In a rear view mirror, a base member adapted to be secured at an inner end to a vehicle and having radially extended serrations adjacent an outer end, a head assembly connected to the base member and including a body member having radially extended serrations adapted to engage the serrations of the base member to retain the head assembly in a predetermined angular relation to the base member, the body portion having a cylindrical recess extending axially within the serrations and having a channel in the walls of the cylindrical recess adjacent but spaced axially with respect to the serrations, an attaching clip carried by the base member and having outwardly flared tabs adapted to project into the annular groove of the body member of the head assembly, and yielding means associated with the body member and urging the attaching clip to maintain said members in theft proof assembled relation.

References Cited in the file of this patent

UNITED STATES PATENTS

| | | |
|---|---|---|
| 985,887 | England | Mar. 7, 1911 |
| 1,626,671 | Enberg | May 3, 1927 |
| 1,797,893 | Zerk | Mar. 24, 1931 |
| 2,225,594 | Murphy | Dec. 17, 1940 |
| 2,467,639 | Tornblom | Apr. 19, 1949 |
| 2,533,475 | Koonter | Dec. 12, 1950 |
| 2,600,893 | Mariani | June 17, 1952 |
| 2,604,818 | Morgenstern | July 29, 1952 |